(12) United States Patent
Gupta et al.

(10) Patent No.: US 12,306,747 B1
(45) Date of Patent: May 20, 2025

(54) DATA STORAGE DEVICE AND METHOD FOR HOST-BASED DYNAMIC JUMP RANGE IDENTIFICATION

(71) Applicant: Western Digital Technologies, Inc., San Jose, CA (US)

(72) Inventors: Ankit Gupta, Ghaziabad (IN); Prathmesh Tandon, Bangalore (IN); Payal Kriplani, Ajmer (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/419,823

(22) Filed: Jan. 23, 2024

(51) Int. Cl.
*G06F 12/02* (2006.01)
(52) U.S. Cl.
CPC ................................ *G06F 12/0223* (2013.01)
(58) Field of Classification Search
CPC .. G06F 12/0246; G06F 12/0223; G06F 3/064; G06F 3/0679; G06F 3/061; G06F 3/0619; G06F 3/0659; G06F 2212/2022
See application file for complete search history.

(56) References Cited

U.S. PATENT DOCUMENTS

2008/0235464 A1\* 9/2008 Traister ............... G06F 12/0246
711/154

\* cited by examiner

*Primary Examiner* — Hiep T Nguyen
(74) *Attorney, Agent, or Firm* — Crowell & Moring LLP (57) ABSTRACT

A data storage device can use a jump range to identify whether a new write command received from a host is part of a sequential stream of write commands even though the logical block address of the new write command is not sequential to the logical block addresses of those other commands. However, using a fixed jump range can result in a new random write command being misclassified as a sequential write command, or vice versa. To address this problem, the embodiments presented herein describe a data storage device that uses a dynamic jump range based on a pattern of write commands previously received from the host. Other embodiments are provided.

20 Claims, 11 Drawing Sheets

| Jump Value | Frequency | Jump Value * Frequency |
|---|---|---|
| 0x2000 | 24 | 0x30000 |
| 0x4000 | 20 | 0x50000 |
| 0x3000 | 100 | 0x12C000 |
| 0x5000 | 50 | 0xFA000 |
| 0x100000 | -30 | -0x1E00000 |
| 0x1500 | 25 | 0x20D00 |
| 0x1000 | 70 | 0x46000 |
| 0x200000 | -40 | -0x5000000 |
| 0x300000 | 3 | 0x900000 |

(Max Jump Threshold Possible → 0x3000)

FIG. 9

DATA STORAGE DEVICE AND METHOD FOR HOST-BASED DYNAMIC JUMP RANGE IDENTIFICATION

BACKGROUND

Logical block addresses (LBAs) of data written to a data storage device by a host can be sequential or non-sequential. Some hosts can issue relatively-large sequential write commands, but the start/end LBA of a current write command can be forward/backward relative to the end/start LBA of a previous write command, thus breaking the sequential run of LBAs. This can lead to scattering of sequential data across multiple random blocks in the memory.

DETAILED DESCRIPTION

The following embodiments generally relate to a data storage device and method for host-based dynamic jump range identification. In one embodiment, a data storage device is provided comprising a memory and one or more processors. The one or more processors, individually or in combination, are configured to: receive a new write command from a host, wherein a start or end logical block address (LBA) of the new write command is non-sequential with respect to an end or start LBA, respectively, of a previously-received write command; determine whether the start or end LBA of the new write command is within a dynamic jump range with respect to the end or start LBA, respectively, of the previously-received write command, wherein the dynamic jump range is based on a history of a plurality of previously-received write commands received from the host; and in response to determining that the start or end LBA of the new write command is within the dynamic jump range with respect to the end or start LBA, respectively, of the previously-received write command, process the new write command as a sequential write command.

In another embodiment, a method is provided that is performed in a data storage device comprising a memory. The method comprises: analyzing a pattern of write commands received from a host to determine a dynamically-defined forward or backward jump range; determining whether a logical block address (LBA) of a new write command received from the host is within the dynamically-defined forward or backward jump range; and in response to determining that the LBA of the new write command received from the host is within the dynamically-defined forward or backward jump range, treating the new write command as part of a sequential stream.

In yet another embodiment, a data storage device is provided comprising: a memory; and means for using a dynamic jump range to determine whether a write command received from a host is part of a set of sequential write commands.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
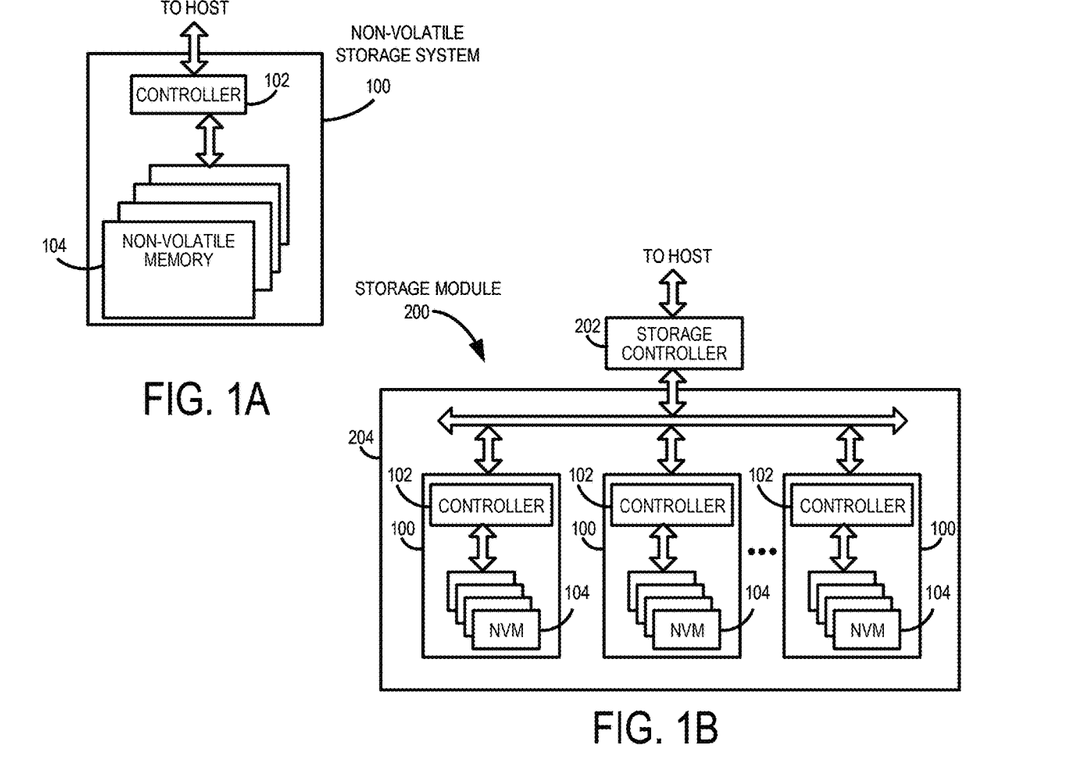
FIG. 1A is a block diagram of a data storage device of an embodiment.
FIG. 1B is a block diagram illustrating a storage module of an embodiment.
Figure 1C:
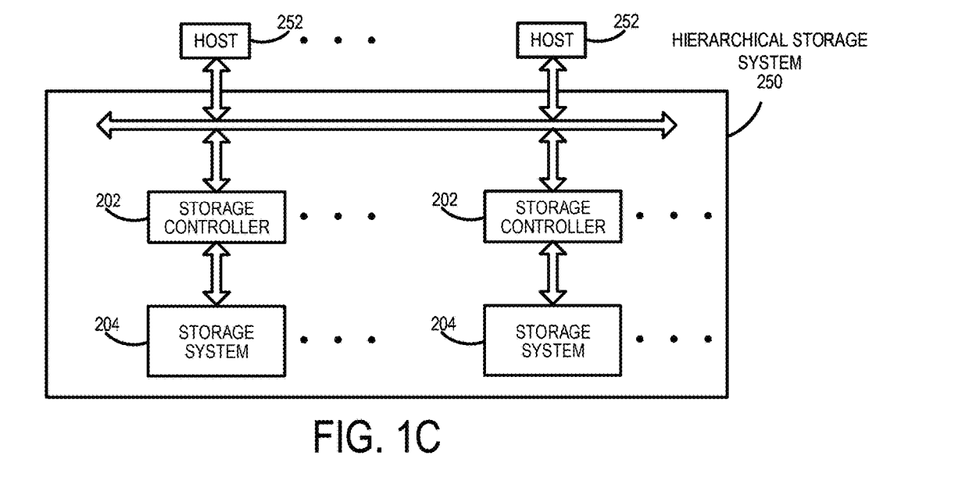
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
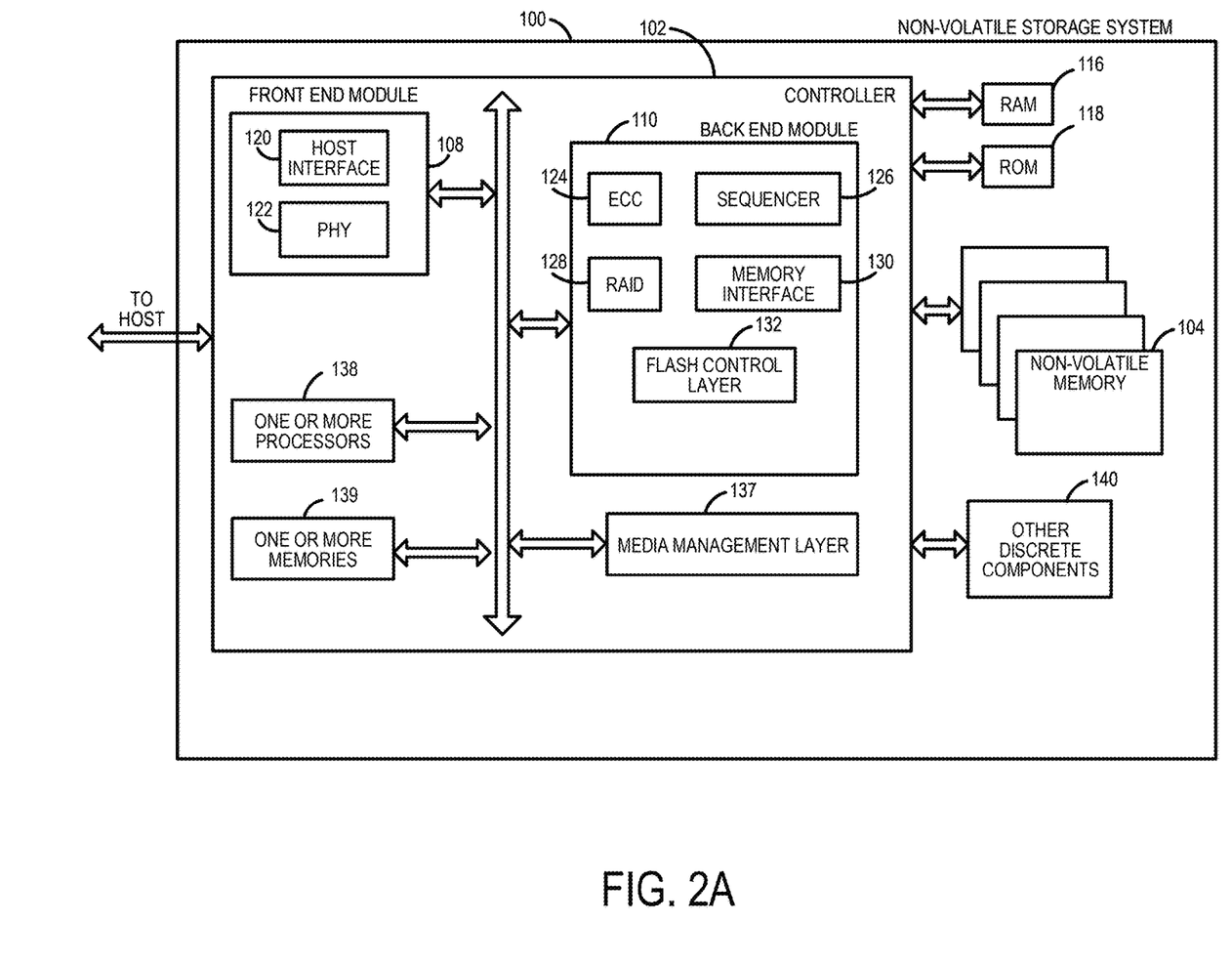
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
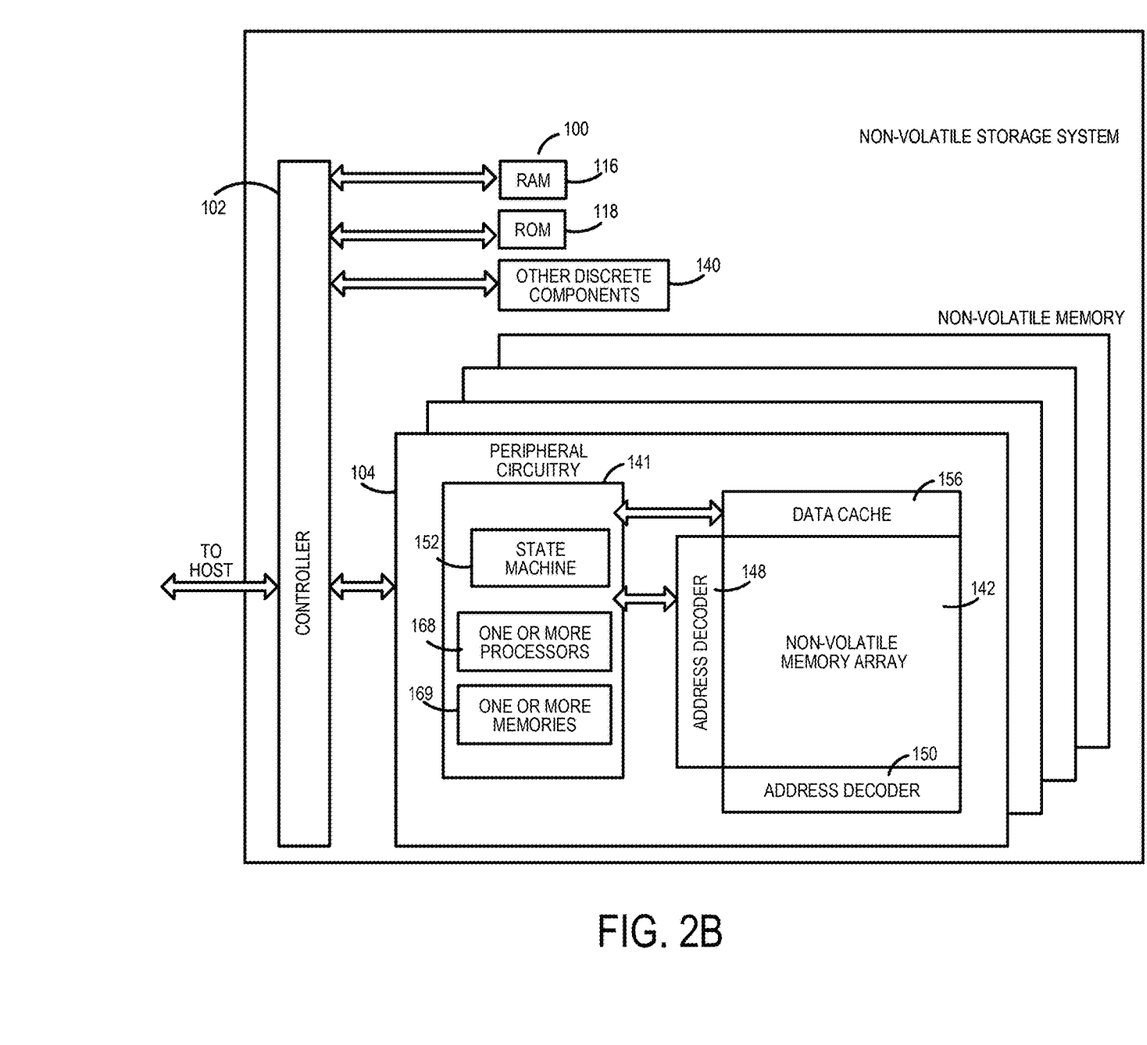
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
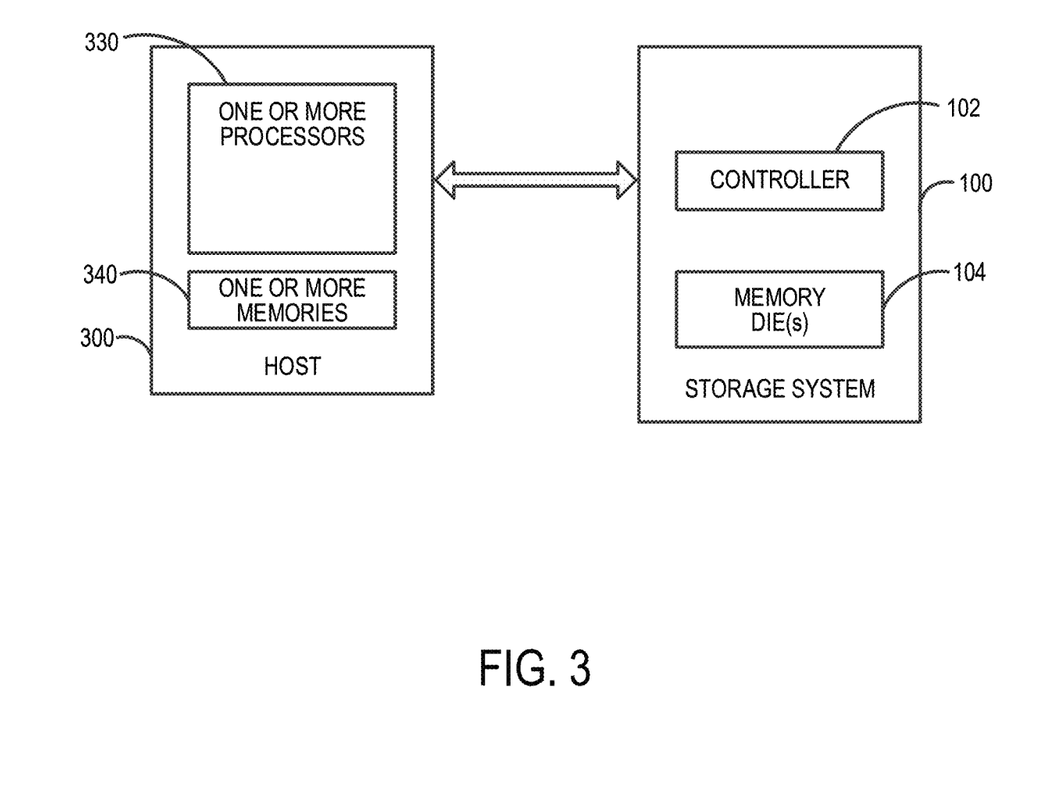
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

A data storage device can route data to a random stream whenever a new stream has been detected or the current write is not sequential with respect to the previous write command. Once the write command transfer reaches beyond a particular threshold, the controller of the data storage device can start routing it to the sequential stream. Some hosts (such as, for example, surveillance cameras, drones, and dashcams) can issue relatively-large sequential write commands, but the start/end logical block address (LBA) of the current write command can be forward/backward relative to the end/start LBA of the previous write command, hence, breaking the sequential run of LBAs. This can lead to continuous opening and closing of a sequential stream. For the new sequential stream, initial data would be routed to a random block, thereby scattering the sequential data across multiple random blocks and increasing maintenance operations, such as garbage collection and updating a flash translation layer (FTL) table. Since the block size has been increasing with newer flash memory nodes, the amount of garbage collection work also increases, resulting in a performance drop. Further, in some usage scenarios, the host can write to one or more non-overlapping logical block address (LBA) ranges sequentially in an interleaved fashion, such that two successive commands appear as random to each other but are instead sequential to their respective streams.

To optimize the routing of large writes that break sequentially, a forward and backward jump range to the current write can be defined. The forward jump range would be the end LBA of sequential stream plus a forward jump threshold, and the backward jump range would be the start LBA of sequential stream minus the backward jump threshold. A jump range that is static or fixed in nature can cause some issues, as illustrated in FIGS. 4A and 4B.

Figure 4A:
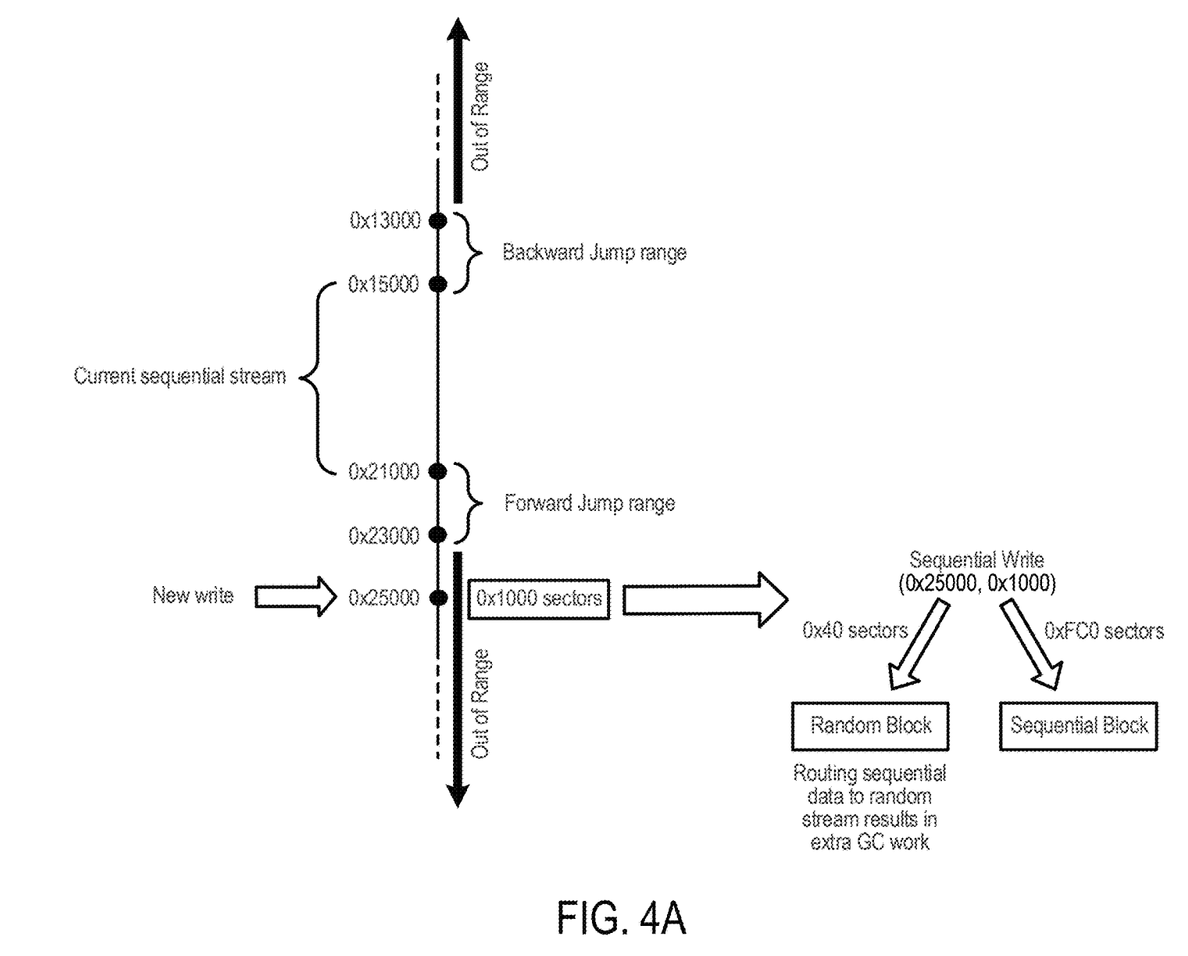
FIGS. 4A and 4B are diagrams that illustrate potential issues with fixed forward and backward jump thresholds.

In FIG. 4A, the data storage device has a fixed forward and backward jump threshold set to 4 MB (i.e., 0x2000 sectors). Also, the host pattern is such that the current large write (start LBA=0x25000, run length=0x1000) will be considered out of both the backward jump range (0x13000-0x15000) and forward jump range (0x21000-0x23000) for the currently-open sequential stream (start LBA-0x15000 and run length-0x6000). Hence, it would be considered non-sequential to the current open stream, thereby causing the controller of the data storage device to route the initial data to a random stream. If this type of write pattern repeats with the next large sequential write having a jump greater than 0x2000 (i.e., more than the forward jump threshold), every new write's initial data would be routed to the random stream causing more garbage collection. In this case, had the jump range been set to a little higher value, the whole data could have been transferred to the sequential stream, thereby reducing the garbage collection and improving performance. However, setting the range too high can also cause issues, which will now be described with reference to FIG. 4B.

Figure 4B:
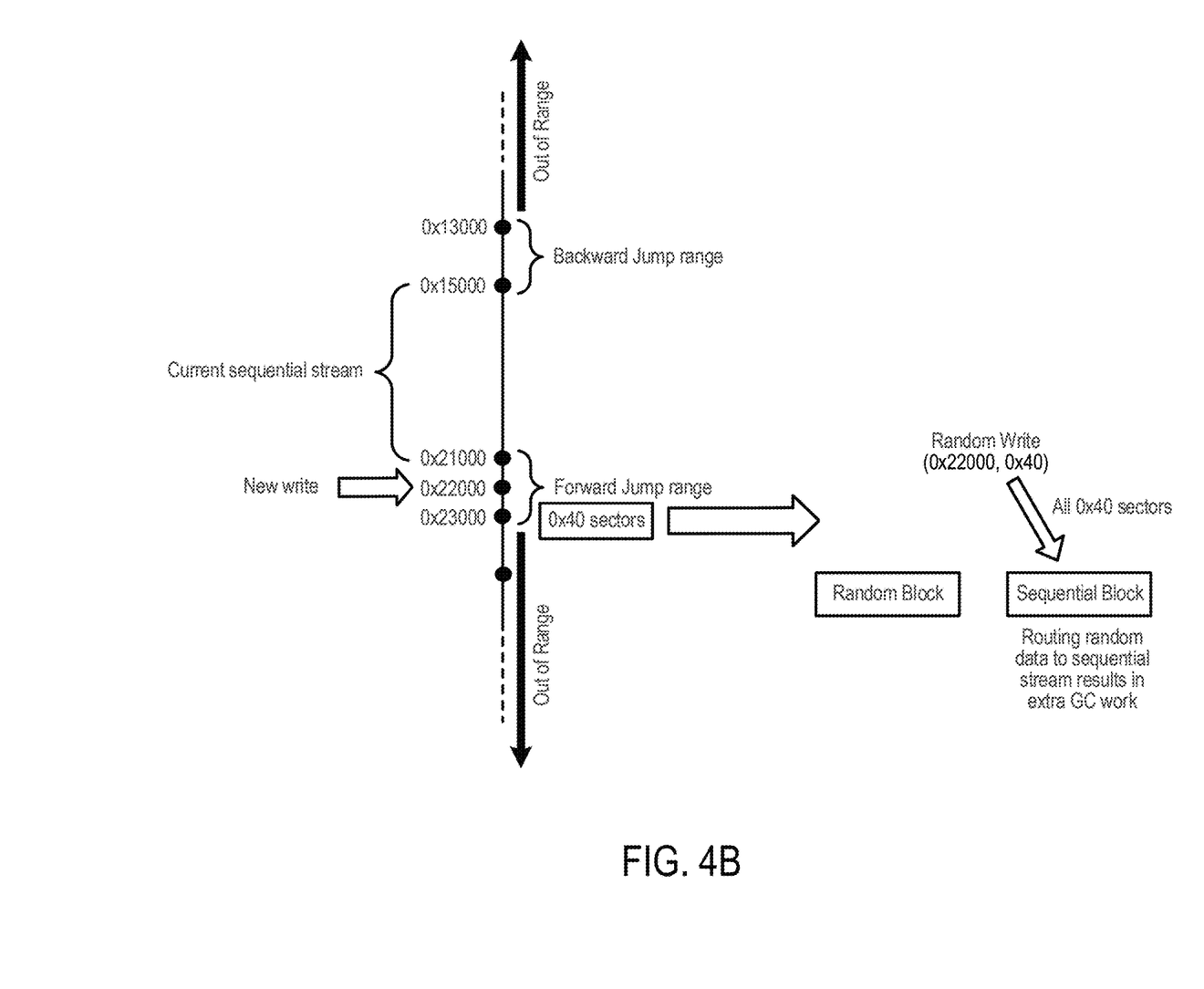

In FIG. 4B, the data storage device has a fixed forward and backward jump threshold set to 4 MB (i.e., 0x2000 sectors). Also, the host pattern is such that the current small random write (start LBA=0x22000 and run length=0x40) will be considered inside the forward jump range (0x21000-0x23000) for the currently-open sequential stream (start LBA=0x15000 and run length=0x6000). Hence, it would be considered sequential to the current open stream, and all the random data would be routed to sequential stream. If this type of write pattern repeats with the next large sequential write having a jump less than 0x2000 (i.e., less than forward or backward jump threshold), every new write's random data would be routed to the sequential stream. Since it is random data, there are higher chances of it getting invalidated due to overwrites later on by the host and hence would result in more garbage collection of sequential blocks having high valid fragment count (VFC). In this case, had the jump range been set to a little lower value, all of the data could have been transferred to a random stream, thereby reducing the garbage collection and improving performance.

To overcome these problems, the following embodiments provide a dynamically-defined jump range that is based on a host pattern, wherein for a particular host, if the next start LBA is within a dynamically-defined forward or backward range of the current write, the controller of the data storage device can consider it as part of the current sequential stream. The use of a dynamically-defined jump range can be used to help meet the stringent performance requirements of different hosts. That is, while a fixed jump range may not be able to serve as a "one-stop solution" for all host scenarios, a dynamic jump range based on host pattern may be able to provide better performance.

In one embodiment, the controller 102 of the data storage device 100 takes the host pattern of write commands as input and decides on the appropriate forward and backward jump range thresholds. In one example implementation, a set of initial jump range thresholds (both forward and backward) is used and then optimized as the host progresses with its writes (both open- and closed-ended). The controller 102 can utilize the host pattern to converge towards optimized jump thresholds tailored for the particular host. In this way, the controller 102 can help ensure that the stream detection logic routes the random and sequential data to their respective streams. This can reduce garbage collection work and increase the stream detection efficiency.

Four possible scenarios can exist if the current and next write are either sequential or random: (1) sequential write followed by another sequential write, (2) sequential write followed by a random write, (3) random write followed by another random write, and (4) random write followed by sequential write. In one example, only the first scenario is valid for calculating forward and backward jump thresholds, and all other scenarios are filtered out by the controller 102 to help ensure that jumps from random write are not considered for the calculation of dynamic jump thresholds.

In one example embodiment, a command history table (CHT) (or other suitable data structure) can be used to keep a record of one or more of the last writes (e.g., the last one hundred writes), the start LBA, the run length, and a counter for measuring invalidation frequency. Also, a forward jump table (FJT) (or other suitable data structure) can be used to keep records of all the possible values of forward jumps and the frequency counter for each jump value. Similarly, a backward jump table (BJT) (or other suitable data structure) can be used for backward jumps. For example, identifying if the previous write was sequential can be based on whether the jump value was less than a threshold (e.g., 256 MB) and the write LBA range was not found in CHT. For other scenarios in this example, the previous write would be considered random.

Figure 5:
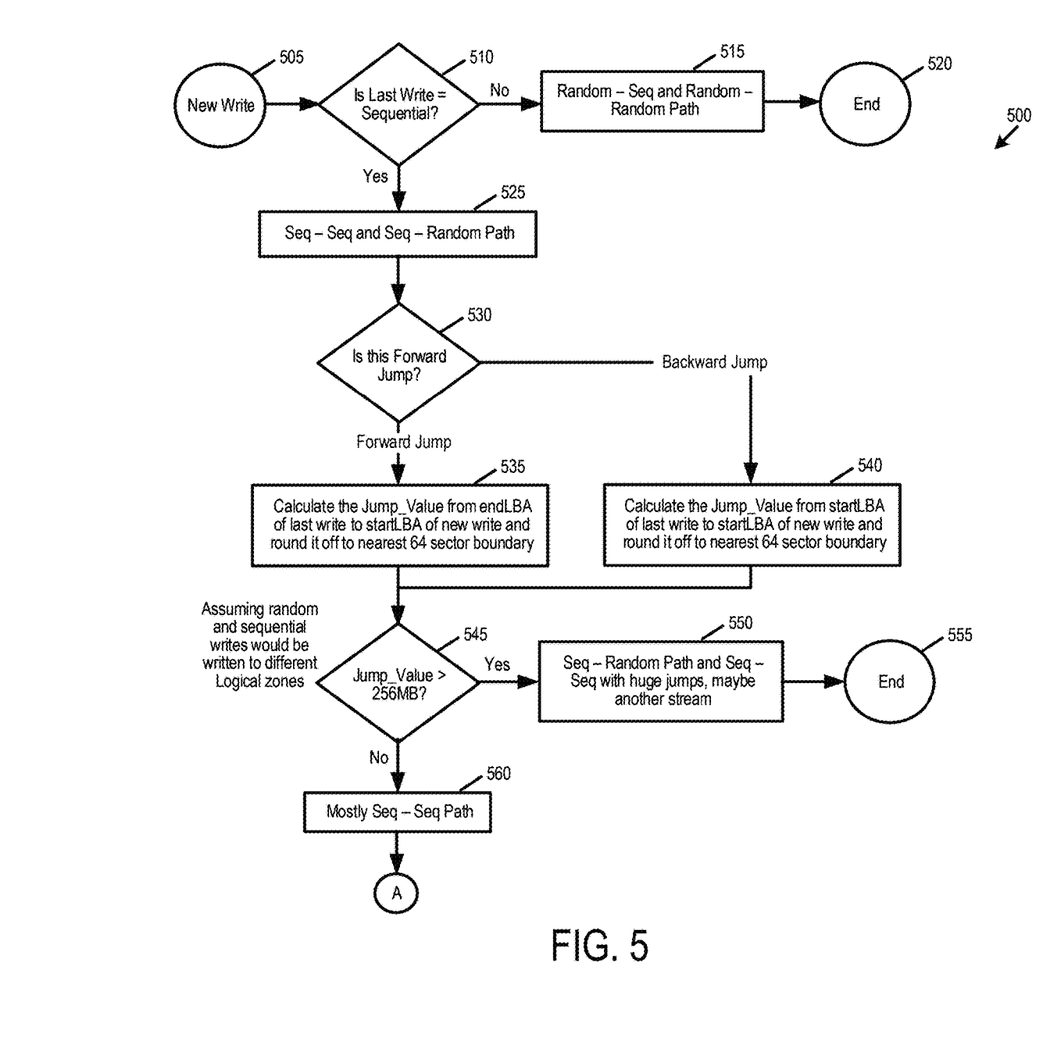
FIG. 5 is a flow chart of a method of an embodiment for host-based dynamic jump range identification.
Figure 6:
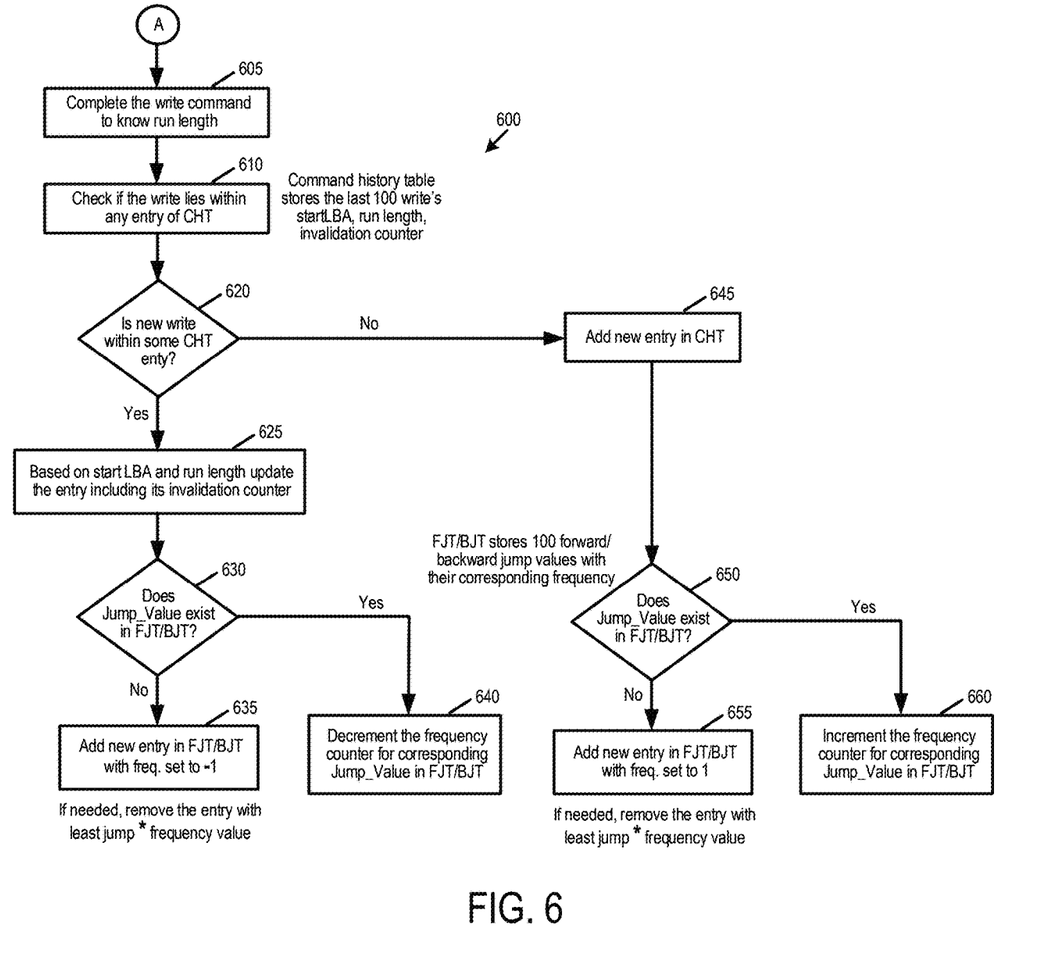
FIG. 6 is a flow chart of a method of an embodiment for host-based dynamic jump range identification.

The following paragraphs describe an example for updating these tables and will be illustrated in conjunction with the flow charts 500, 600 of FIGS. 5 and 6. As shown in FIG. 5, upon receiving a new write command from the host 300 (act 505), the controller 102 of the data storage device 100 determines if the last write was a sequential write (act 510). In response to determining that the last write was not a sequential write, the controller 102 concludes that a random-sequential or random-random scenario exists (act 515), and the method ends (act 520). (Recall from the above discussion that, in this example, the host-based dynamic jump range identification method is applied only for a "sequential write followed by another sequential write" scenario.) However, in response to determining that the last write was a sequential write, the controller 102 concludes that a sequential-sequential or sequential-random scenario exists used (act 525).

The controller 102 then determines if the LBA of the new write command is a jump forward from the end LBA of the previous write command (act 530). If the LBA is a jump forward, the controller 102 calculates the jump value from the end LBA of the previous write command to the start LBA of the new write command (act 535). However, if the new is a backwards jump, the controller 102 calculates the jump value from the start LBA of the last write command to the start LBA of the new write command (act 540). In this example, and without limitation, the controller 102 rounds off the either calculated jump value to the nearest 64 sector boundary value.

Next, the controller 102 determines if the jump value is greater than a threshold (here, 256 MB) (act 545). If the jump value is greater than the threshold, the controller 102 concludes that a sequential-random or sequential-sequential scenario exists with a large jump (act 550), and the method ends (act 555). However, if the jump value is not greater than the threshold, the controller 102 concludes that a mostly sequential-sequential scenario exists (act 560), and the method proceeds to the flow chart 600 in FIG. 6.

As shown in FIG. 6, the controller 102 completes the write command to know the run length (act 605) and checks if the write lies within any entry of the command history table (acts 610 and 620). If the write lies within any entry of the command history table, the controller 102 updates the entry (act 625) and determines if the jump value exists in the forward jump table or in the backward jump table (act 630). If it does not, the controller 102 adds the entry in the forward jump table or in the backward jump table (act 635). If it does, the controller 102 decrements the frequency counter (act 640).

Returning to act 620, if the new write is not within some command history table entry, the controller 102 adds a new entry to the command history table (act 645). The controller 102 then determines if the jump value exists in the forward jump table or in the backward jump table (act 650). If it does not, the controller 102 adds the entry in the forward jump table or in the backward jump table (act 655). If it does, the controller 102 decrements the frequency counter (act 660).

As shown above, in this example, if the last write was found to not invalidate any sequential data, the controller 102 checks if the start LBA of the new write command is greater than the end LBA of the currently-open sequential stream. If is it, this write is considered as a forward jump. The controller 102 calculates the jump (i.e., the difference between the end LBA of the open stream and the start LBA of the new write command) and rounds it off to the nearest 64-sector boundary (to ensure that small aberrations in the jump do not correspond to separate entries in the jump table) and keeps it in a variable. To filter out any rare big jumps due to the host 300 switching from one logical zone to another, the controller 102 can ignore any jump greater than 256 MB (or any other threshold, which can be made configurable according to the type of product). Once the write is complete (since the run length would be known at write completion for open-ended commands), the controller 102 can check if the region that the command was trying to write is already fully- or partly-written by any command existing in the CHT.

If not found in the CHT, the controller 102 can add a new entry into it with start LBA, run length of the command, and a counter for invalidation set to 0. The last write would be set to sequential. Also, for this write check, if the jump value already exists in the FJT or BJT, the frequency counter is increased for the corresponding jump value; otherwise, a new entry is added in the jump table for the corresponding jump value, and the counter is initialized to 1. If the entry is found in the CHT and is a complete overwrite, the counter is incremented for the previous entry in the table. If a partial overwrite exists, the counter is incremented for the previous entry in the table, but in this case, the start LBA or run length of that entry in the CHT is updated to ensure the current overwrite also gets considered to be part of random write. The last write is set to be random. Also, for this write check, if the jump value already exists in the FJT or BJT, the frequency counter is decreased for the corresponding jump value; otherwise, a new entry in the jump table for the corresponding jump value is set, and the counter is initialized to −1.

Figure 7:
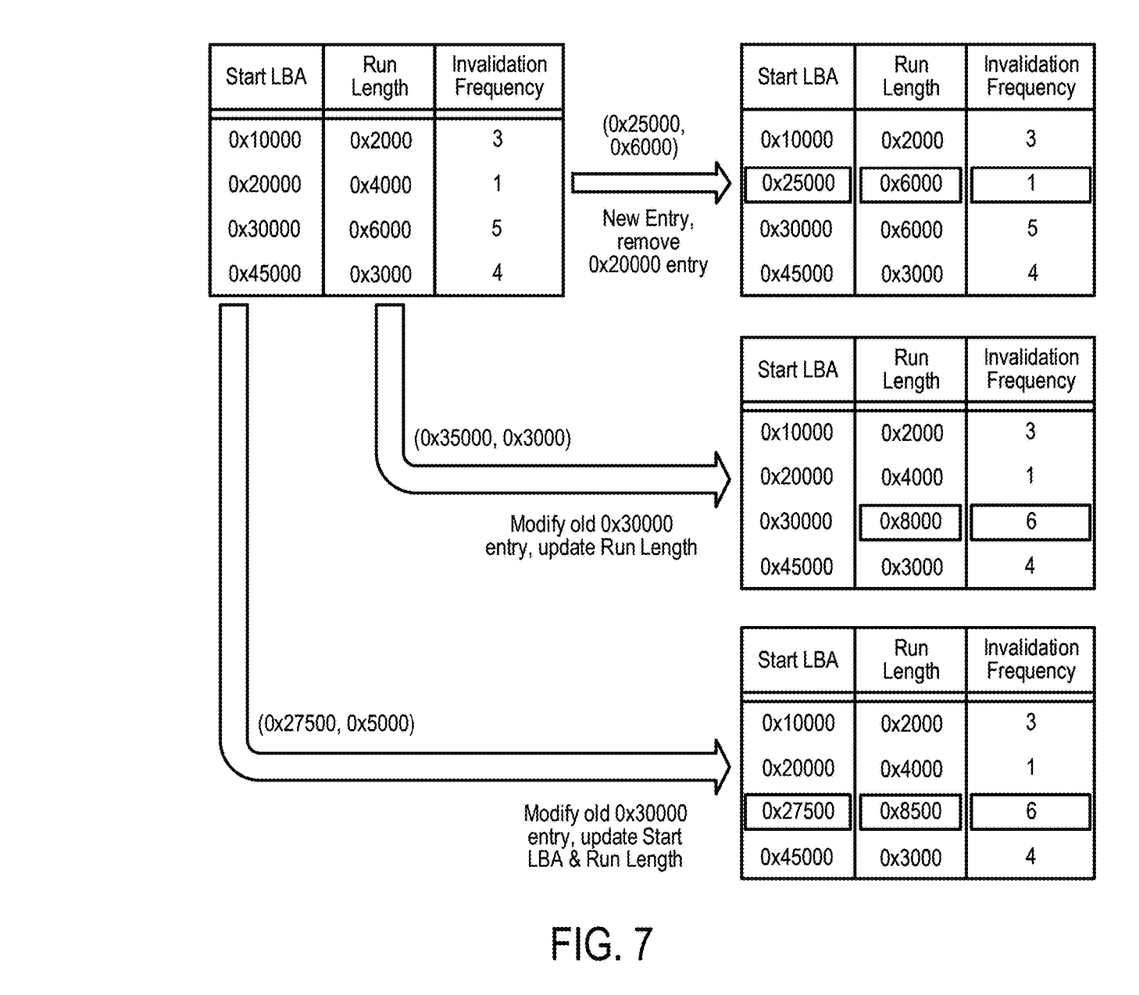
FIG. 7 is a diagram illustrating updating a command history table of an embodiment.

Various command history table management techniques can be used, as illustrated in FIG. 7. For example, if there are empty slots in the table, a new entry can be added in the empty slot. If the table is full, the controller 102 can overwrite an entry with the lowest invalidation frequency. Also, regarding updating an older entry, the controller 102 can update the start LBA and run length in case the new write is partially overwriting the previous region, increment the invalidation frequency counter for that entry, and insert the updated entry such that entries are in descending order of the counter value.

Figure 8:
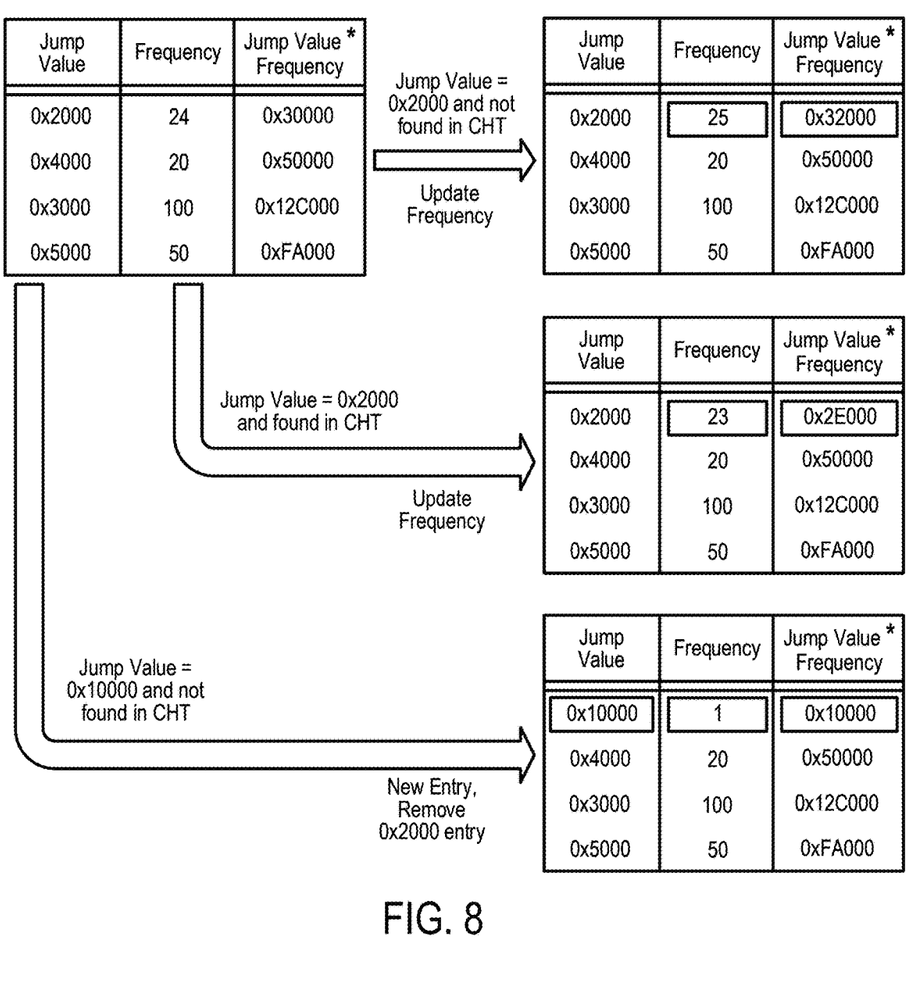
FIG. 8 is a diagram illustrating updating a forward/backward jump table of an embodiment.

Various techniques can be used to manage the forward/backward jump table, as illustrated in FIG. 8. For example, regarding adding a new entry, if there are empty slots in the table, the controller 102 can add a new entry in the empty slot. If the table is full, the controller 102 can overwrite the entry with the lowest (Jump Value*Frequency Counter) value. Regarding updating an older entry, the controller 102 can increase/decrease the frequency counter for that entry based on finding the entry in the CHT.

Figure 9:
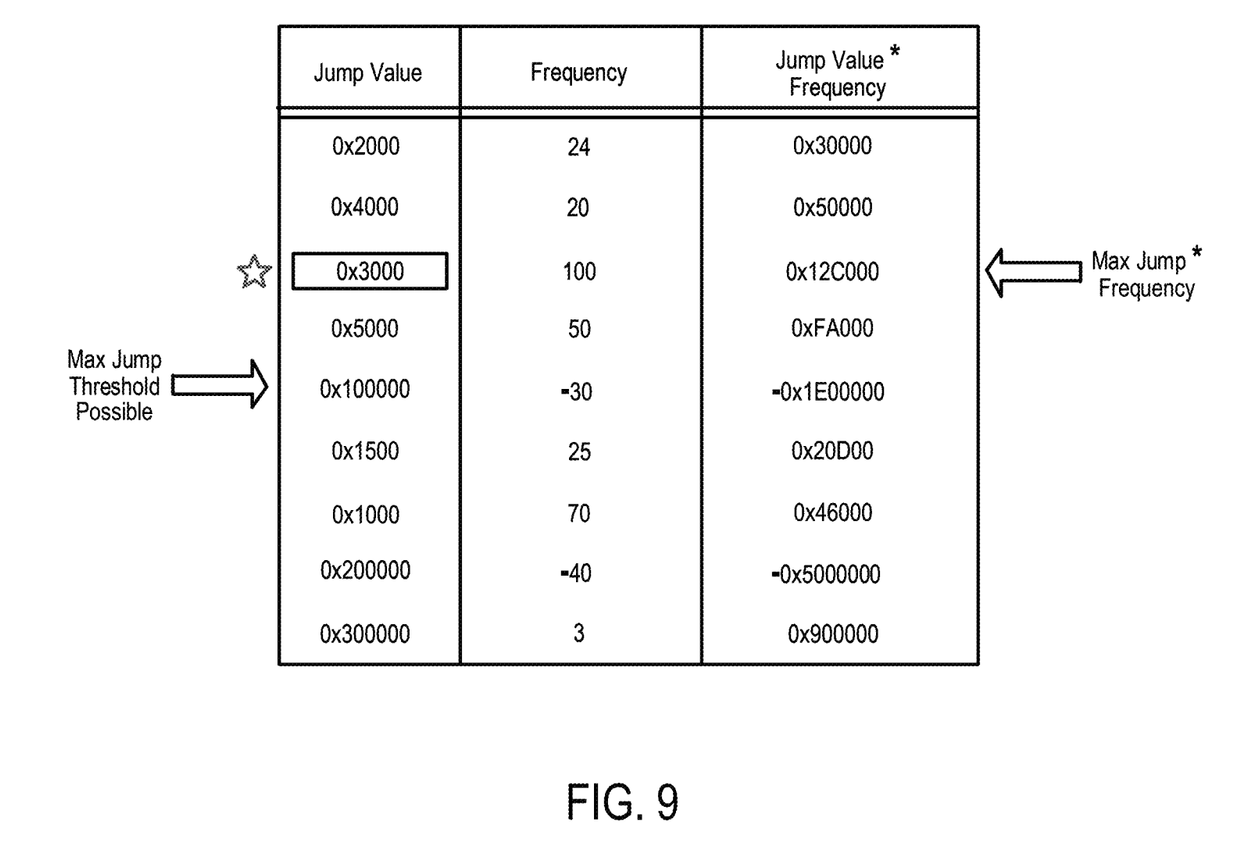
FIG. 9 is a diagram illustrating extracting a jump threshold from a jump table of an embodiment.

Also, the controller 102 can calculate the dynamic jump range in any suitable way, as illustrated in FIG. 9. For example, once a substantial number of writes have happened to the memory 104, the controller 102 can find the entry in the FIT with the lowest counter value (i.e., the maximum negative value) and set that to "max jump threshold possible." For the jump table, the controller 102 can take all the entries with positive frequency and jump values less than the "max jump threshold possible" and calculate the (Jump Value*Frequency) for each of the entries. The controller 102 can then find the highest value possible and take the corresponding jump value as the forward jump threshold. The same approach as mentioned in the above two points needs can be followed to find the backward jump threshold using the backward jump table.

There are several advantages associated with these embodiments. For example, these embodiments can be used to increase write performance of a data storage device, as well as improve sustained performance and endurance due to a reduction in write amplification. Also, these embodiments can be used to handle irregularity of sequential data (including reverse sequential write) generated by different hosts.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
   receive a new write command from a host, wherein a start or end logical block address (LBA) of the new write command is non-sequential with respect to an end or start LBA, respectively, of a previously-received write command;
   determine whether the start or end LBA of the new write command is within a dynamic jump range with respect to the end or start LBA, respectively, of the previously-received write command, wherein the dynamic jump range is based on a history of a plurality of previously-received write commands received from the host; and
   in response to determining that the start or end LBA of the new write command is within the dynamic jump range with respect to the end or start LBA, respectively, of the previously-received write command:
   process the new write command as a sequential write command by writing data from the new write command in a region in the memory;

determine whether the region in the memory was previously at least partially written in by one of the plurality of previously-received write commands:
  in response to determining that the region in the memory was at least partially written in by the one of the plurality of previously-received write commands, decrement a frequency counter; and
  in response to determining that the region in the memory was not at least partially written in by the one of the plurality of previously-received write commands, increment the frequency counter;
wherein the dynamic jump range is dynamically determined based on a value of the frequency counter.

2. The data storage device of claim 1, wherein the one or more processors, individually or in combination, are further configured to:
  in response to determining that the start or end LBA of the new write command is not within the dynamic jump range with respect to the end or start LBA, respectively, of the previously-received write command, process the new write command as a random write command.

3. The data storage device of claim 1, wherein the history of the plurality of previously-received write commands from the host is stored in a command history table.

4. The data storage device of claim 3, wherein the one or more processors, individually or in combination, are further configured to:
  update the command history table; and
  update the dynamic jump range based on the updated command history table.

5. The data storage device of claim 1, wherein the one or more processors, individually or in combination, are further configured to:
  retrieve the dynamic jump range from a forward jump table or a backward jump table.

6. The data storage device of claim 5, wherein the one or more processors, individually or in combination, are further configured to:
  update the forward jump table or the backward jump table.

7. The data storage device of claim 1, wherein the one or more processors, individually or in combination, are further configured to:
  calculate a jump value between the start or end LBA of the new write command and the end or start LBA, respectively, of the previously-received write command; and
  determine whether the jump value is greater than a threshold;
  wherein determining that the start or end LBA of the new write command is within the dynamic jump range with respect to the end or start LBA, respectively, of the previously-received write command is performed only in response to determining that the jump value is less than the threshold.

8. The data storage device of claim 7, wherein calculating the jump value further comprises rounding the jump value to a nearest boundary value.

9. The data storage device of claim 1, wherein the one or more processors, individually or in combination, are further configured to:
  determine whether the previously-received write command was a sequential write command;
  wherein determining that the start or end LBA of the new write command is within the dynamic jump range with respect to the end or start LBA, respectively, of the previously-received write command is performed only in response to determining that the previously-received write command was a sequential write command.

10. The data storage device of claim 1, wherein the memory comprises a three-dimensional memory.

11. In a data storage device comprising a memory, a method comprising:
  analyzing a pattern of write commands previously received from a host to determine a dynamically-defined forward or backward jump range;
  determining whether a logical block address (LBA) of a new write command received from the host is within the dynamically-defined forward or backward jump range;
  in response to determining that the LBA of the new write command received from the host is within the dynamically-defined forward or backward jump range, treating the new write command as part of a sequential stream by writing data in a region in the memory;
  determining whether the region in the memory was previously at least partially written in by one of the write commands previously received from the host;
  in response to determining that the region in the memory was at least partially written in by one of the write commands previously received from the host, decrementing a frequency counter; and
  in response to determining that the region in the memory was not at least partially written in by one of the write commands previously received from the host, incrementing the frequency counter;
  wherein the dynamically-defined forward or backward jump range is dynamically determined based on a value of the frequency counter.

12. The method of claim 11, wherein the determining is performed in response to determining that a previous-executed write command was a sequential command.

13. The method of claim 12, wherein the determining is performed further in response to determining that a jump value between the new write command and a previously-executed write command is less than a threshold.

14. The method of claim 11, wherein the pattern of write commands is stored in a command history table.

15. The method of claim 14, wherein the command history table comprises the following fields: start logical block address, run length, and invalidation frequency counter.

16. The method of claim 11, wherein a forward jump table stores records of possible values of forward jumps and the frequency counter.

17. The method of claim 11, wherein a backward jump table stores records of possible values of backward jumps and the frequency counter.

18. The method of claim 11, wherein the determining comprises determining whether a start or end LBA of the new write command is within the dynamically-defined forward or backward jump range with respect to an end or start LBA, respectively, of a previously-executed write command.

19. The method of claim 11, wherein the memory comprises a three-dimensional memory.

20. A data storage device comprising:
  a memory; and
  means for:
    receiving a new write command from a host, wherein a start or end logical block address (LBA) of the new write command is non-sequential with respect to an end or start LBA, respectively, of a previously-received write command;

determining whether the start or end LBA of the new write command is within a dynamic jump range with respect to the end or start LBA, respectively, of the previously-received write command, wherein the dynamic jump range is based on a history of a plurality of previously-received write commands received from the host; and in response to determining that the start or end LBA of the new write command is within the dynamic jump range with respect to the end or start LBA, respectively of the previously-received write command:

processing the new write command as a sequential write command by writing data from the new write command in a region in the memory:

determining whether the region in the memory was previously at least partially written in by one of the plurality of previously-received write commands;

in response to determining that the region in the memory was at least partially written in by the one of the plurality of previously-received write commands, decrementing a frequency counter; and in response to determining that the region in the memory was not at least partially written in by the one of the plurality of previously-received write commands, incrementing the frequency counter;

wherein the dynamic jump range is dynamically determined based on a value of the frequency counter.

* * * * *